I. M. Singer.
Sewing Mach.

No. 10,842.   Patented May 2, 1854.

I. M. Singer.
Sewing Mach.
Nº 10842.    Patented May 2. 1854

Sheet 2 – 6 Sheets.

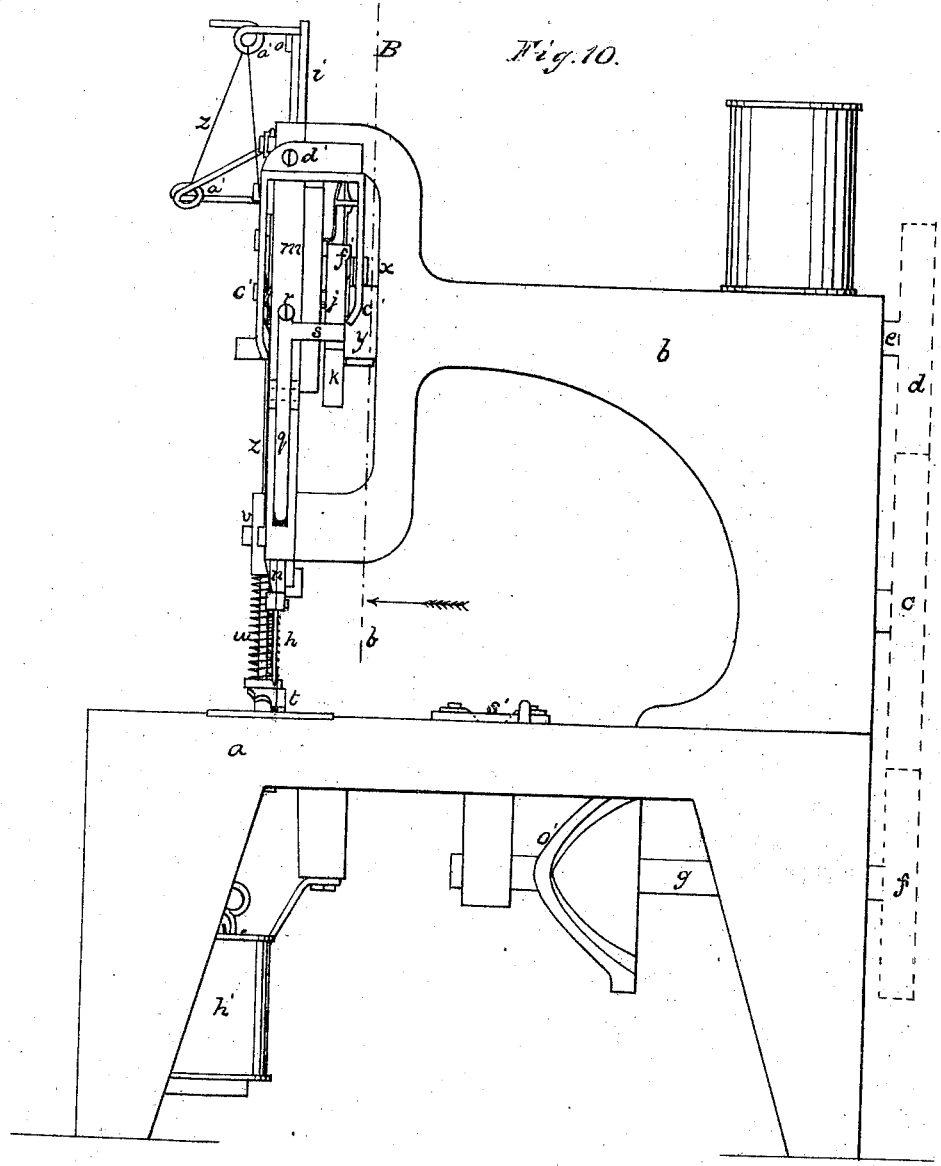

Sheet 4_6 Sheets.

I. M. Singer.
Sewing Mach.

Nº 10842.              Patented May 2, 1854

Sheet 5. 6 Sheets.
I. M. Singer.
Sewing Mach.
N° 10842. Patented May 2. 1854.
Fig. 13.
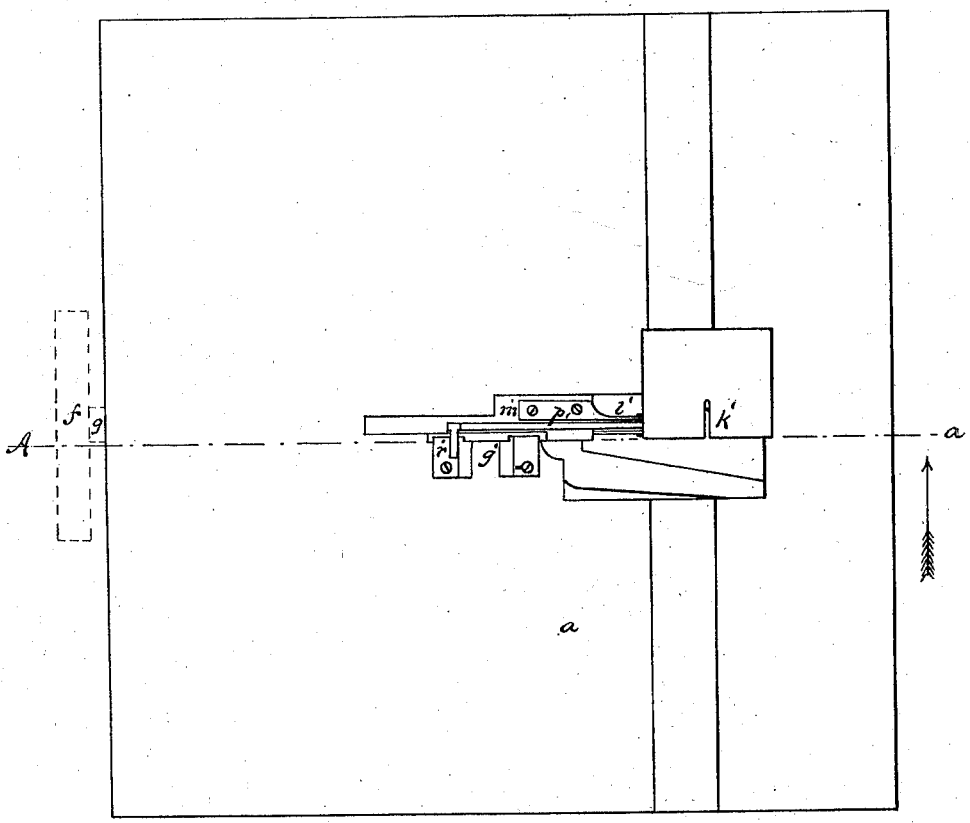
Fig. 14. A, a.
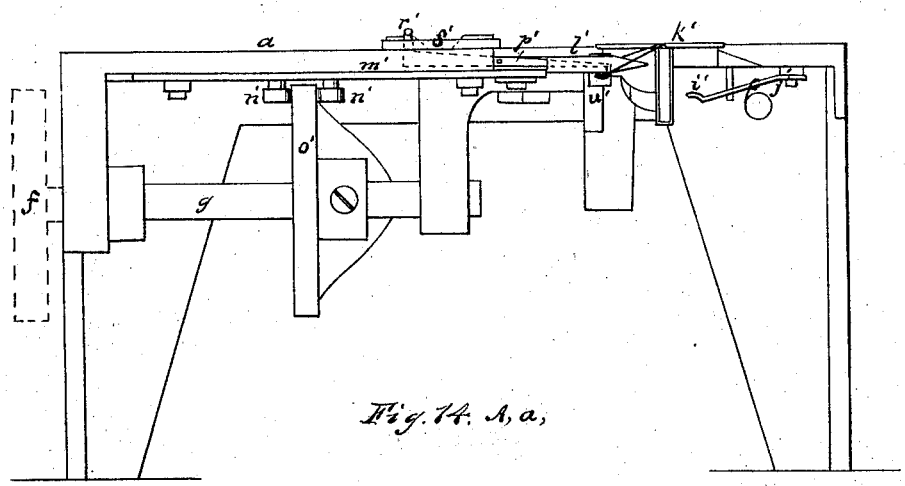

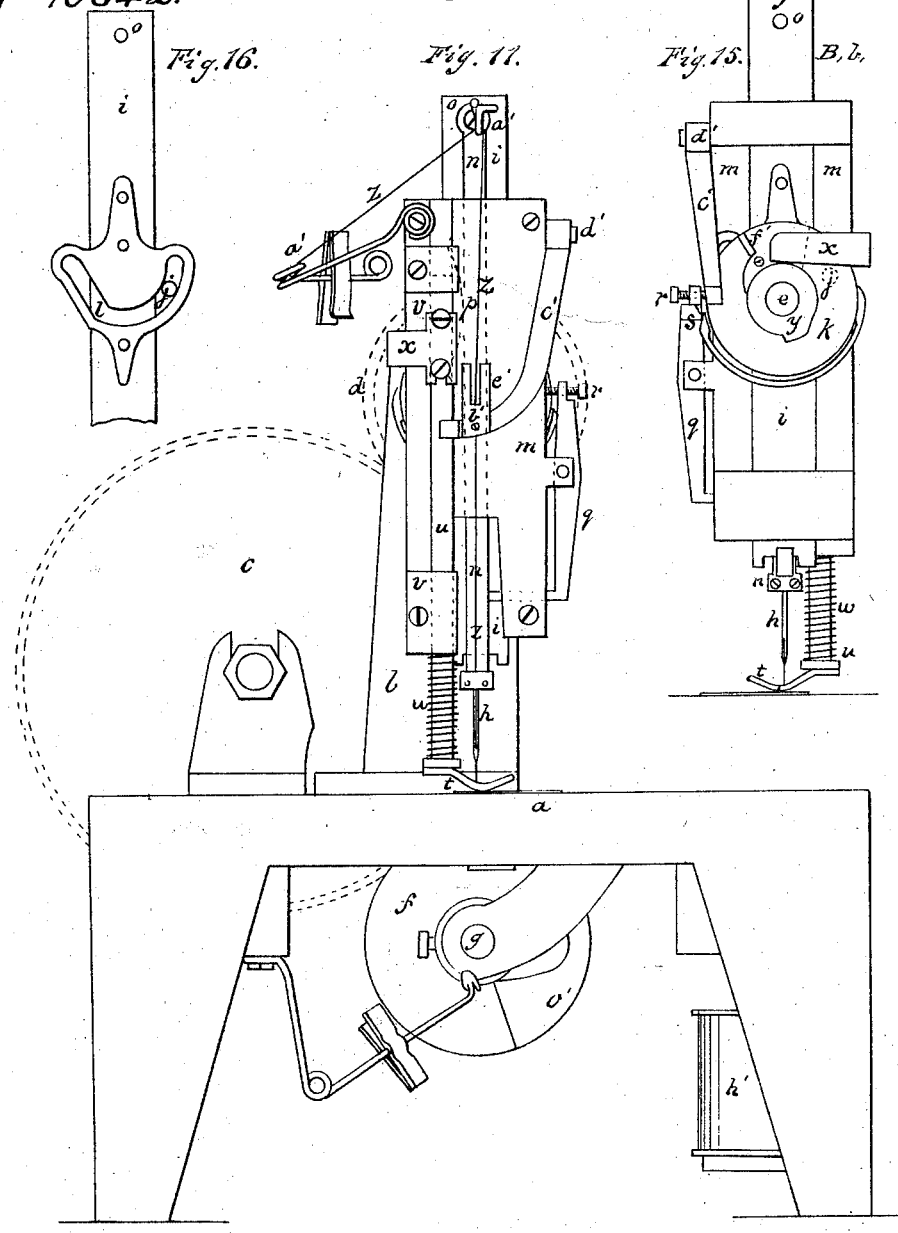

UNITED STATES PATENT OFFICE.

ISAAC M. SINGER, OF NEW YORK, N. Y.

IMPROVEMENT IN SEWING-MACHINES.

Specification forming part of Letters Patent No. 10,842, dated May 2, 1854.

*To all whom it may concern:*

Be it known that I, ISAAC M. SINGER, of the city, county, and State of New York, have invented certain new and useful Improvements in the Method of Forming Seams, and in Machinery for Sewing, of which the following is a full, clear, and exact description, reference being had to the accompanying drawings, making part of this specification, in which—

Figure 5:
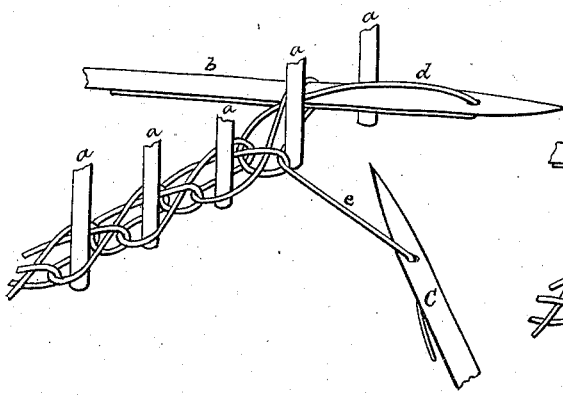
Figure 6:
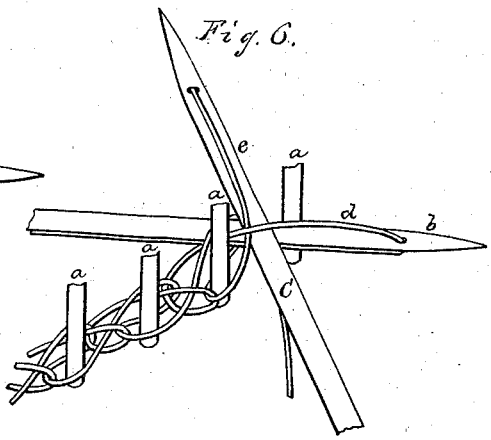
Figure 12:
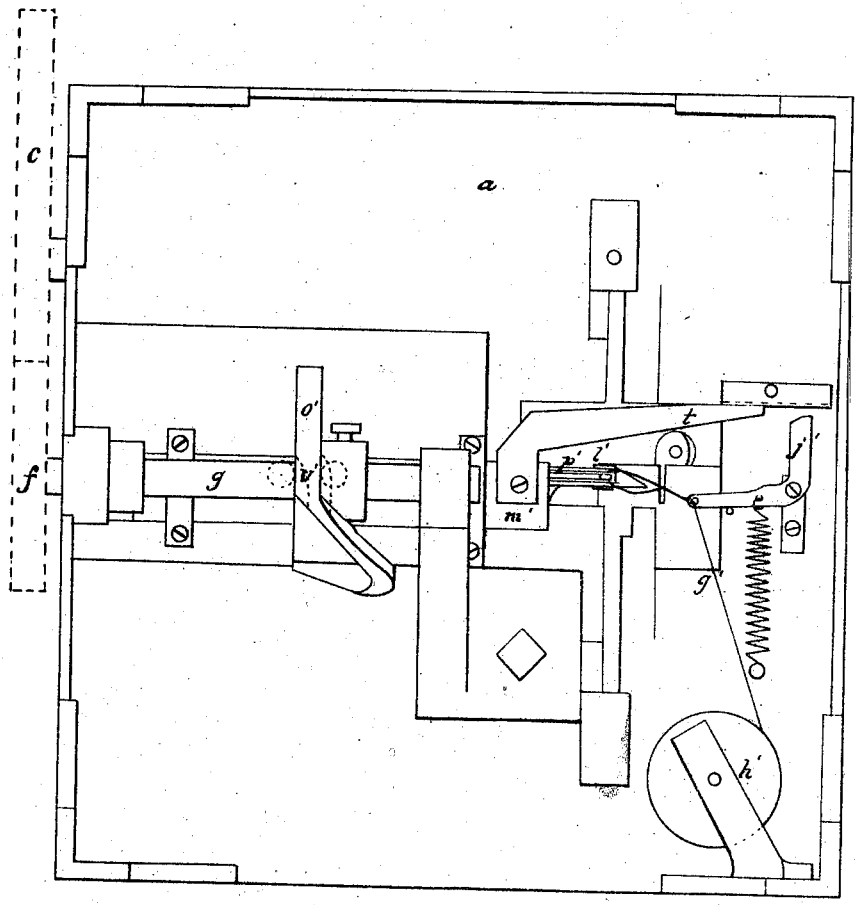

Figures 1, 2, 3, 4, Plate 1, represent one of the known methods of forming seams with two threads; Figs. 5 and 6, same plate, another known method; and Figs. 7, 8, and 9, my improved method; and in the several figures of Plate 2, Fig. 10 is a side elevation of the machine; Fig. 11, a front elevation; Fig. 12, an inverted plan of the bottom; Fig. 13, a plan of the table with so much of the machinery as can be seen below it; Fig. 14, a vertical section taken at the line A *a* of Fig. 13; Fig. 15, a vertical section taken at the line B *b* of Fig. 10; and Fig. 16, a back view of the needle-carrier with its cam-groove.

Figure 4:
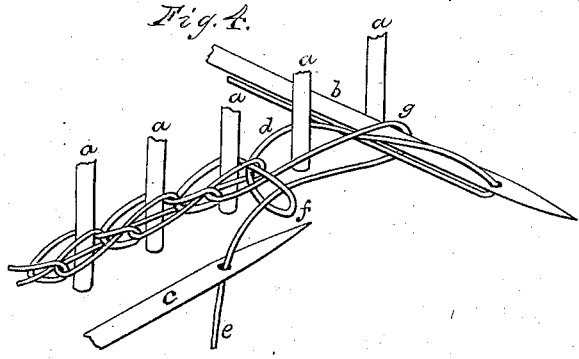
Figure 1:
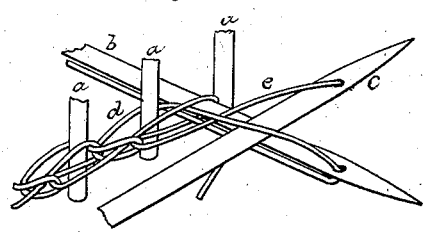
Figure 2:
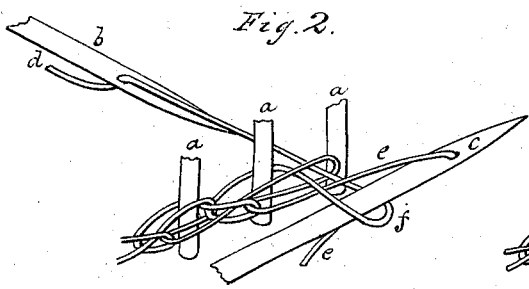
Figure 3:
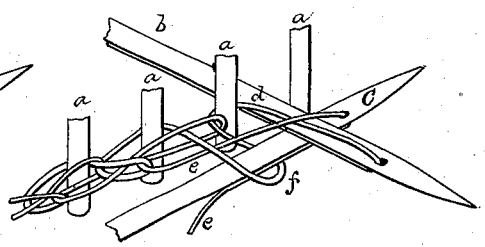

Seams have been formed with two threads without carrying one thread entirely through the loop formed with the other thread, as in the machines which sew with a needle and shuttle; and the better to distinguish my new method of forming and stitching seams with two threads, I will describe the only two methods heretofore known. The seam made with the needle and shuttle machines I do not deem necessary to describe, as it is well known, and is of an entirely different character. The first of the said known methods is represented at Figs. 1, 2, 3, and 4, Plate 1, formed around a series of pins, *a*, instead of cloth, the better to exhibit the concatenation. The two threads are represented by different colors, *d* and *e*, and each passes through the eye of a needle just back of the point. The needle *b* is the one which perforates the cloth, and the other, *c*, works under the cloth and at right angles, or nearly so, to the first. The needle *b* with its thread passes through the cloth, the needle *c* with its thread then passes between the needle *b* and its thread, as represented at Fig. 1, and in that position the needle *b* is withdrawn, which leaves its thread *d* in the form of a loop, *f*, around the needle *c* and its thread *e*, as seen at Fig. 2. The needle *b* then progresses the distance of one stitch, and then passes with its thread through the cloth and between the needle *c* and its thread *e*, as seen at Fig. 3, and then the needle *c* is withdrawn, which leaves its thread in the form of a loop, *g*, around the needle *b* and its thread *d*, and leaving its loop *g* within the loop *f* of the thread *d*, which, when drawn tight, grips the thread *e* double against the cloth; and while the needle *b* with its thread *d* is yet in the loop *g* of the thread *e*, the needle *c* with its thread *e* again passes between the needle *b* and its thread *d*, which is then withdrawn, leaving another loop, *f*, around the needle *c* and its thread, which is there double, to be again gripped against the cloths at the next stitch, and so on to any number of stitches. In this way each thread is alternately formed into a loop, in which loop the other thread lies double, the one part extending in nearly a straight line from the stitch back of this loop to the stitch beyond it, while the other takes a short turn around the loop, and, passing in nearly a straight line, extends the distance of two stitches. The other method is represented at Figs. 5 and 6. In this method the two needles *b* and *c* with their threads *d* and *e* work at right angles to each other, or nearly so. They are on opposite sides of, and both pass through the cloth diagonally. The needle *b* passes through the cloth with its thread *d*, as seen in Fig. 5, and then the needle *c*, with its thread *e*, passes through between the needle *b* and its thread *d*, and then through the cloth, so that when this needle *b* is withdrawn the thread *d* forms a loop around the needle *c* and its thread, which is double. The needle *b* then progresses the distance of one stitch, and then passes between the needle *c* and its thread, and again through the cloth, so that when the needle *c* is in turn withdrawn it leaves its thread around the needle *b* and its thread *d*, and leaves its thread double in the loop of the thread *d* previously formed. In this way it will be seen that the concatenation of the two threads and the series of stitches is effected, forming a seam like the previous one, with the only difference that in the latter the two threads appear on the two surfaces of the cloth. The objections to both are that the needles must pass each other alternately on opposite sides—that is, the needle *b* first passes over the needle *c*, and then the needle *c* must pass over the needle *b*—and in the first the threads on the under surface cross each other, forming a lumpy surface, with the thread which forms the upper surface of the seam the most prominent on the under surface, and hence the most liable to wear and break off, which would destroy the seam; and the second method is seriously objectionable, for the reason that the two needles must perforate the cloth in nearly the same places, which necessarily renders a seam comparatively weak and the threads too loose or free; and both are seriously objectionable, for the reason that the stitch is drawn tight by the act of forcing in the needle to form the next stitch. By my improved method I avoid all these serious objections, and form a seam which on one side has the appearance of stitching with a single thread, while on the other side three threads are laid on the surface in such manner as to be adapted to the most beautiful and ornamental embroidery.

The first part of my invention relates to an improvement on a method of forming seams with one thread, for which I have made application for Letters Patent, with the view to apply that method of effecting the concatenation of the stitches with two threads, which is effected by carrying one thread through the cloth with an eye-pointed needle, and then forming a loop with the other or second thread with a looping-instrument; and instead of alternately looping one thread around the other, the looper is carried through between the needle and its thread. A second loop is then formed with the second thread, which last loop is carried back through the loop in the needle-thread and through the first loop of the second thread, thus completely tying the second thread around the first.

The second part of my invention relates to machinery for sewing or stitching seams made in accordance with the first part of my invention, parts of which are applicable to machinery for sewing seams with one thread and other kinds of seams with two threads; and this part of my invention consists in combining with an eye-pointed needle for carrying one thread through the cloth, and with a looping apparatus for forming the needle-thread into a loop, an apparatus for carrying the second thread within the reach of the looping apparatus, that the said second thread may be formed into loops, one on each side of the needle-thread, the said looping apparatus being so constituted as to draw the loop last formed with the second thread through the loop of the needle-thread and the previously-formed loop of the second thread.

Figure 7:
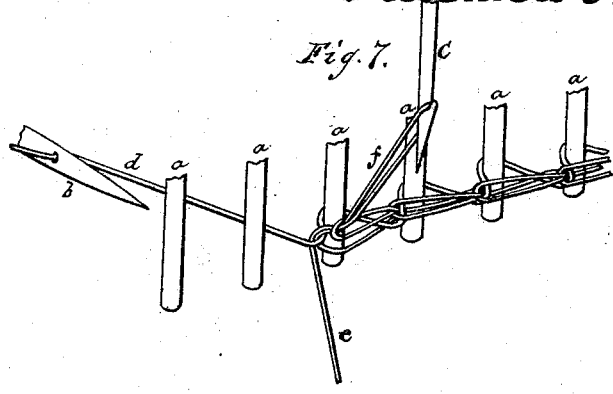
Figure 8:
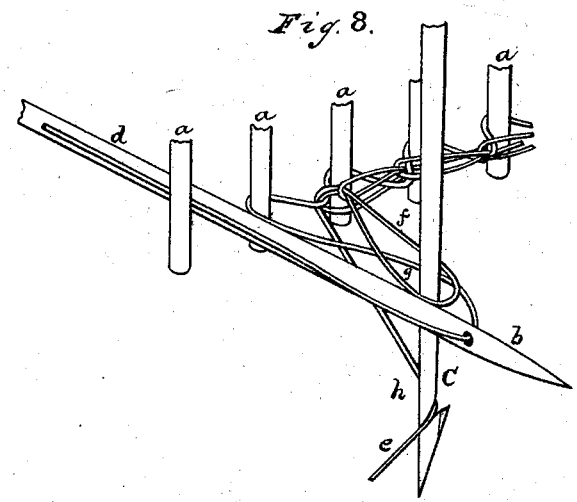
Figure 9:
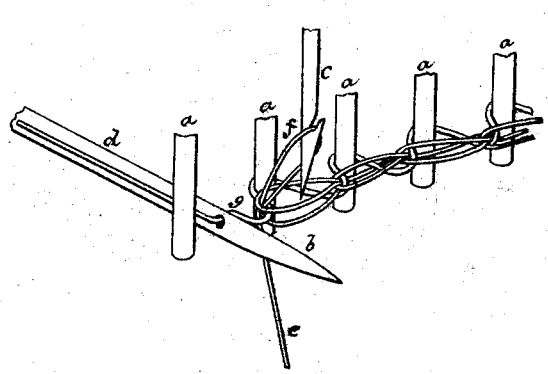

The second part of my invention is represented in the figures of Plate 2, in which the same letters indicate like parts, In Figs. 7, 8, 9, Plate 1, of the accompanying drawings $a$ represents the series of pins instead of the cloth, and $b$ the needle with its thread $d$, and $c$ a looper with its thread $e$. A loop, $f$, is formed with the looper $c$ from the thread $e$. The needle $b$ then carries the thread $d$ through the cloth, forming a loop, $g$, through which the looper passes by entering between the needle and its thread. The looper $c$ then catches the thread $e$ beyond or below the thread $d$, and forms a loop, $h$. In this position the thread $d$, forming the needle-loop $g$, lies between the two loops $f$ and $h$ of the thread $e$. The looper is then drawn back with the loop $h$, which is drawn through the needle-loop $g$, and therefore around the thread $e$, and thence through the loop $f$ of the thread $e$, which is thus liberated. The needle and looper are drawn back simultaneously, by which the tie is completed and the stitch drawn in. From this it will be seen that the thread E, doubled, is passed through the previously-formed loop and thus gripped and held, and the thread $d$ completely embraced by the thread $e$. One thread appears single on one surface, representing stitching, and the other thread passes on the other surface, like three threads, lying smooth and flat, side by side, and well adapted to embroider, and as the threads lie flat and smooth the three threads at once must be worn before the seam gives way, and, what is very important, the stitch is drawn tight by the withdrawing motion of the needle, which is of great practical advantage when seams are formed by machinery.

In Plate 2 of the accompanying drawings the same letters indicate like parts in all the figures.

The table $a$ is suitably adapted to receive the cloth or other substances to be sewed or stitched, and supports the standard or frame $b$, which carries the needle and its appendages and the pad with its appendages for holding the cloth, &c., to the table. The master-wheel $c$, operated by any suitable motor, communicates motion by the cog-wheel $d$ to the shaft $e$ for operating the needle, and by another wheel, $f$, to the cam-shaft $g$ below the table for operating the looper, &c. The needle $h$ is the eye-pointed needle usually employed and connected with the carrier $i$, receiving the required reciprocating motion from a crank-pin, $j$, on the cam-wheel $k$ on the end of the shaft $e$, the crank-pin being fitted to work in a cam-groove, $l$, on the back of the needle-carrier. This needle-carrier slides vertically in ways $m$, and the needle, instead of being attached, as usual, to the lower end of it, is attached to the lower end of a vibrating bar, $n$, connected with the carrier $i$ by a joint-pin, $o$, near the top, so that it can vibrate laterally with the needle. A spring (represented by dotted lines at $p$, Fig. 11) tends constantly to push the bar with the needle to the right, and on the other side the said bar is acted upon by one end of a lever, $q$, the opposite end of which is provided with a set-screw, $r$, to regulate the distance to which the bar and needle shall vibrate to the right. The upper end of this lever is bent, as at $s$, to extend over the periphery of the cam-wheel $k$, which cam is formed for the purpose of operating the lever to vibrate the bar and needle after it has reached the end of its downward motion, and before the looper is operated to interlock the thread. This lateral motion of the needle is to advance the cloth preparatory to the next stitch, so that by the set-screw $r$ on the lever $q$ the extent of this feed-motion can be regulated with the greatest accuracy. The form of this cam must be such as not to permit the bar and its needle to be forced back by the spring $p$ until the needle is withdrawn from the cloth; but when the feed motion is given to the bar and needle to advance the cloth the foot or pad $t$, which holds the cloth down to the table, must be lifted up to liberate it. For this purpose the pad is attached to the lower end of a bar, $u$, adapted to slide vertically in ways $v$, with a helical spring, $w$, surrounding the lower end of the bar, the tension of which presses the pad onto the cloth. The upper end of the bar $u$ has an arm, $x$, which is acted upon at the time the feed motion is given to the needle by a cam, $y$, on the shaft, the cam being so formed as to permit the pad to be again forced down onto the cloth the moment the cloth has been advanced. The needle-thread $z$ passes from a spool or bobbin through appropriate guides, $a'$, one of which is attached to the needle-carrier to make the required slack for the operation of the looper, to be hereinafter described. From this guide the thread, on its way to the eye of the needle, passes under what is termed a "check-pad," $b'$, which at the required time makes pressure on the thread to hold it. This pad is on the end of a lever, $c'$, that turns on a fulcrum-pin, $d'$. The pad is kept out clear of the thread by the tension of a spring, $e'$, and forced against the thread to hold it until the point of the needle has entered the cloth by the action of a cam, $f'$, on the face of the cam-wheel $k$ against the rear arm of the lever $c$. The object of this arrangement is to hold the thread tight from the cloth upward, while the needle enters the cloth to insure the laying of the thread smoothly on the surface of the cloth, and to prevent the point of the needle from catching and entering the thread, which would be the consequence if the thread were not held tight while the needle enters the cloth. The needle with its thread having passed down through the cloth and given the feed motion, the next operation then takes place. The second thread, $g'$, passes from a spool or bobbin, $h'$, with the tension properly regulated, through a vibrating guide, $i'$, on the end of a lever, $j$, and thence through the slot $k'$ in the table. This thread $g'$ is to be interlaced with the needle-thread, which is effected by the vibrating guide $i'$ and an instrument termed the "looper" $l'$, which is flat and straight on the face toward the needle, and beveled on the opposite face and top and bottom, to form a point, which will enter freely between the needle and its thread. This looper is attached to a carrier, $m'$, adapted to slide freely but accurately in a groove in the table at right angles to the needle, and is provided at bottom with two rollers $n'$, $n'$, or wrist-pins, which embrace a cam, $o$, on the shaft, the said cam being of such form, as represented, that so soon as the needle has descended and given the feed motion the looper enters between the needle and its thread and then moves back again, the needle beginning to rise the moment the looper has fairly entered. The body of the looper is hollow, and within it is fitted a lever, $p'$, which turns on a fulcrum-pin at or near its middle, the forward end being barbed, as shown by dotted lines, and the rear end provided with a wrist-pin, $r'$, which rides on a plane, $s'$, on the table $a$, the two ends of which are oppositely inclined, and, for the purpose of adjustment, made separate from each other and from the flat plane, so that they can be moved toward or from each other. A spring within the body of the looper tends constantly to elevate the barbed end of the lever $p'$, so as to have the barb within the looper, and to keep the wrist-pin in contact with the surface of the plane $s'$. As the looper enters between the needle and its thread the barb is within the body of the looper, and toward the end of its forward motion the wrist-pin rides up one of the inclined planes, which carries the barb below the bottom of the looper, and at the same time a projecting piece, $t'$, on the carrier strikes the outer arm of the lever $j'$, which carries the guide $i'$, with its thread $g'$, across the path of the looper, so that on the return of the looper this thread is caught in the barb of the lever $p'$, which draws the said thread in the form of a loop, B. This time the needle has been drawn up, leaving its thread in the form of a loop around the body of the looper. The barb of the lever $p'$ is then drawn within the body of the looper, still holding the loop of the thread $g'$, which is thus drawn through the loop of the needle-thread, then liberated, and the stitch drawn tight by the continued back movement, the loop being still held by the barb of the looper, and the stitch drawn tight by the withdrawing motions of the needle and looper. Toward the end of the back motion of the looper the barb again descends below the looper, that the thread may be free to slide or run thereon, and to liberate at the next motion the loop which it holds. The first stitch has been described, but when the next stitch is commenced there is one loop of the thread $g'$ around the body of the looper which is held back by the friction of a piece of cloth, $u'$, as the looper advances to enter between the needle and its thread, and to form another loop with the thread $g'$ by the repetition of the movements already described, so that the loop of the needle-thread is formed between the newly-formed loop of the thread $g'$ and the one formed by the previous operation, so that by the return motion of the looper the loop last formed with the thread $g'$ is drawn through the loop of the needle-thread and the previously-formed loop of the thread $g$, thus forming a seam on the principle above described.

If the thread-guide $i'$ for operating the thread $g'$, or second thread, be omitted, and the cam $o$ be varied in form, as represented by the dotted lines at $v'$, to give the period of rest in the back motion of the looper, the machine will then sew a seam with one thread.

What I claim as my invention, and desire to secure by Letters Patent, is—

1. Forming seams for stitching and sewing with two threads, the first of which is carried through the cloth at each stitch and interlaced with the second by forming a loop with the second on one side of a loop formed with the first, and then forming a second loop with the second thread, which is drawn through the loop formed with the first thread and through the first loop formed with the second thread, as described.

2. The needle and looper, in combination with the instrument or its equivalent for carrying or guiding the second thread within the range of the looper, substantially as described.

ISAAC M. SINGER.

Witnesses:
LINUS YALE, Jr.,
CHAS. W. BAMBURGH.